United States Patent [19]
Stoltman

[11] 3,879,936
[45] Apr. 29, 1975

[54] GAS TURBINE FUEL CONTROL
[75] Inventor: Donald D. Stoltman, Henrietta, N.Y.
[73] Assignee: General Motors Corporation, Detroit, Mich.
[22] Filed: July 19, 1973
[21] Appl. No.: 380,992

[52] U.S. Cl. .................. 60/39.28 R; 60/39.28 T
[51] Int. Cl. ............................................. F02c 9/10
[58] Field of Search .............. 60/39.28 R, 39.28 T

[56] References Cited
UNITED STATES PATENTS

| | | | |
|---|---|---|---|
| 3,350,880 | 11/1967 | McCombs | 60/39.28 R |
| 3,381,470 | 5/1968 | Hammerstein | 60/39.28 R |
| 3,618,315 | 11/1971 | Avery | 60/39.28 R |
| 3,777,480 | 12/1973 | Stoltman | 60/39.28 R |
| 3,777,482 | 12/1973 | Canale | 60/39.28 R |

Primary Examiner—Clarence R. Gordon
Attorney, Agent, or Firm—Paul Fitzpatrick

[57] ABSTRACT

A fuel supply and control system for a gas turbine engine includes a pump, a fuel metering valve, and a cut-off valve connected in series between a source of fuel and the fuel nozzle of the combustion apparatus. The rate of fuel supply responds to a manually operable power level control. The flow area of the metering valve is determined by the product of the power level input and the pressure of air supplied to the combustion apparatus. A by-pass valve controlling the pressure drop across the metering valve responds to this pressure drop and to a bias proportional to ambient temperature so that the metering head is proportional to ambient temperature. The cutoff valve closes when the pressure of the fuel delivered to the fuel nozzle is above that called for by the power control input.

8 Claims, 12 Drawing Figures

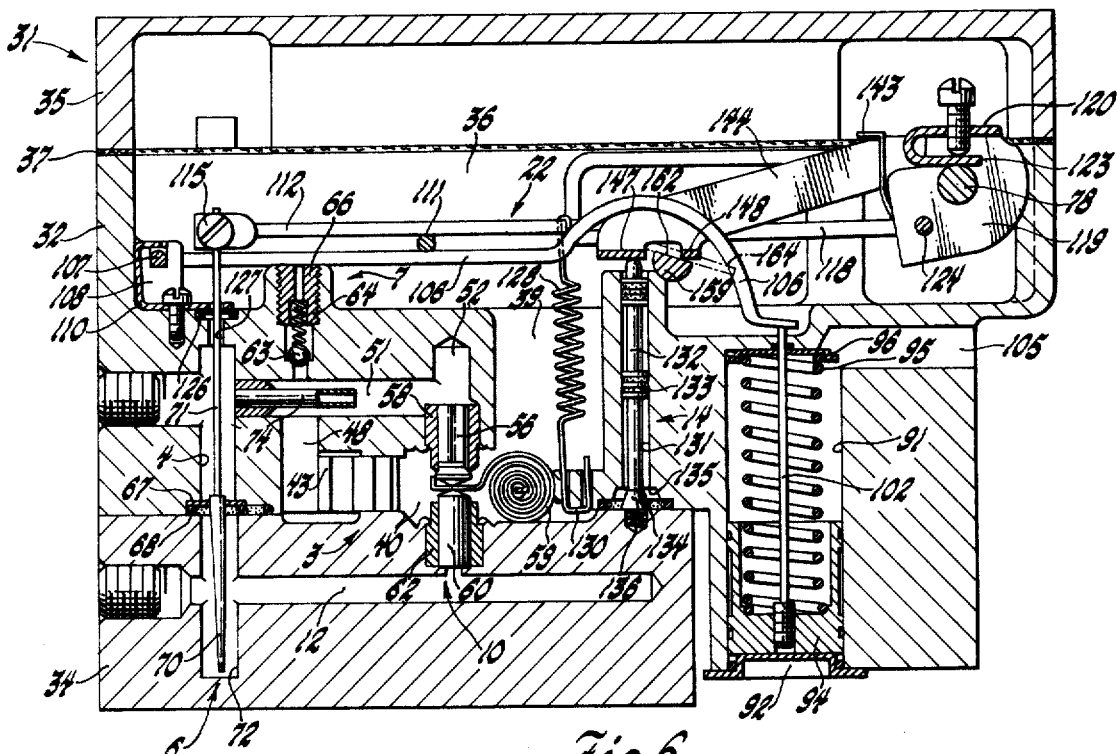

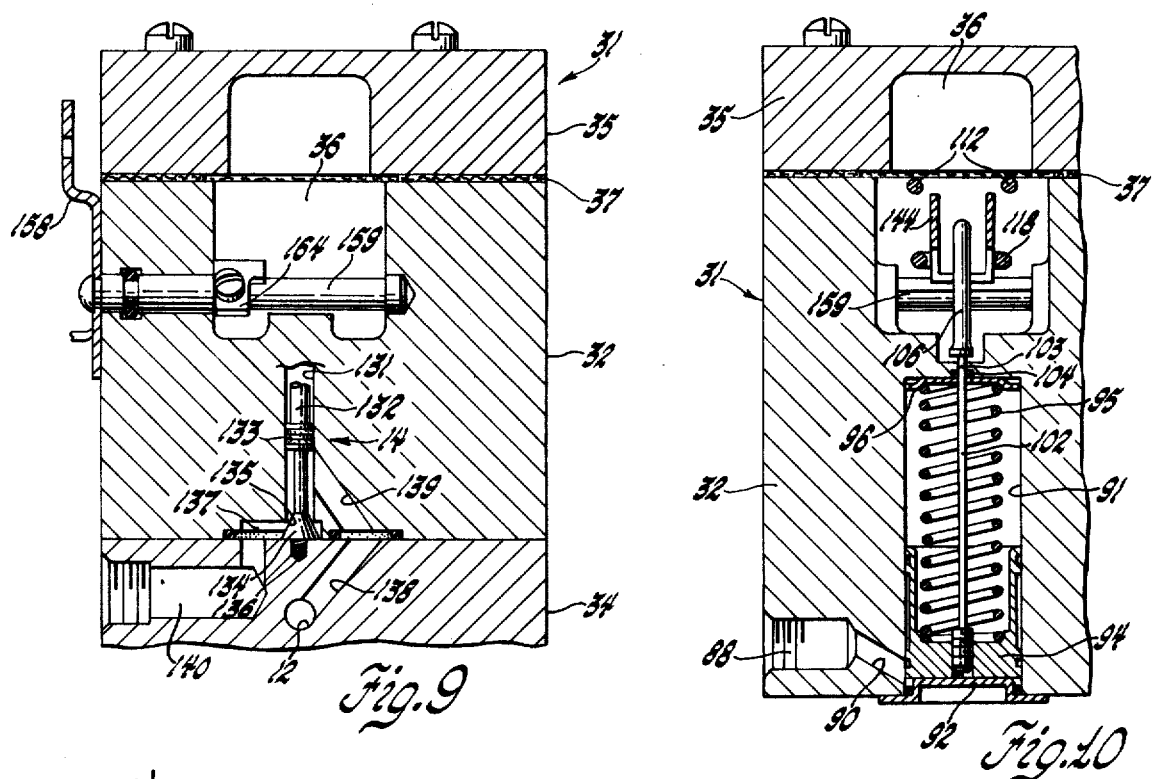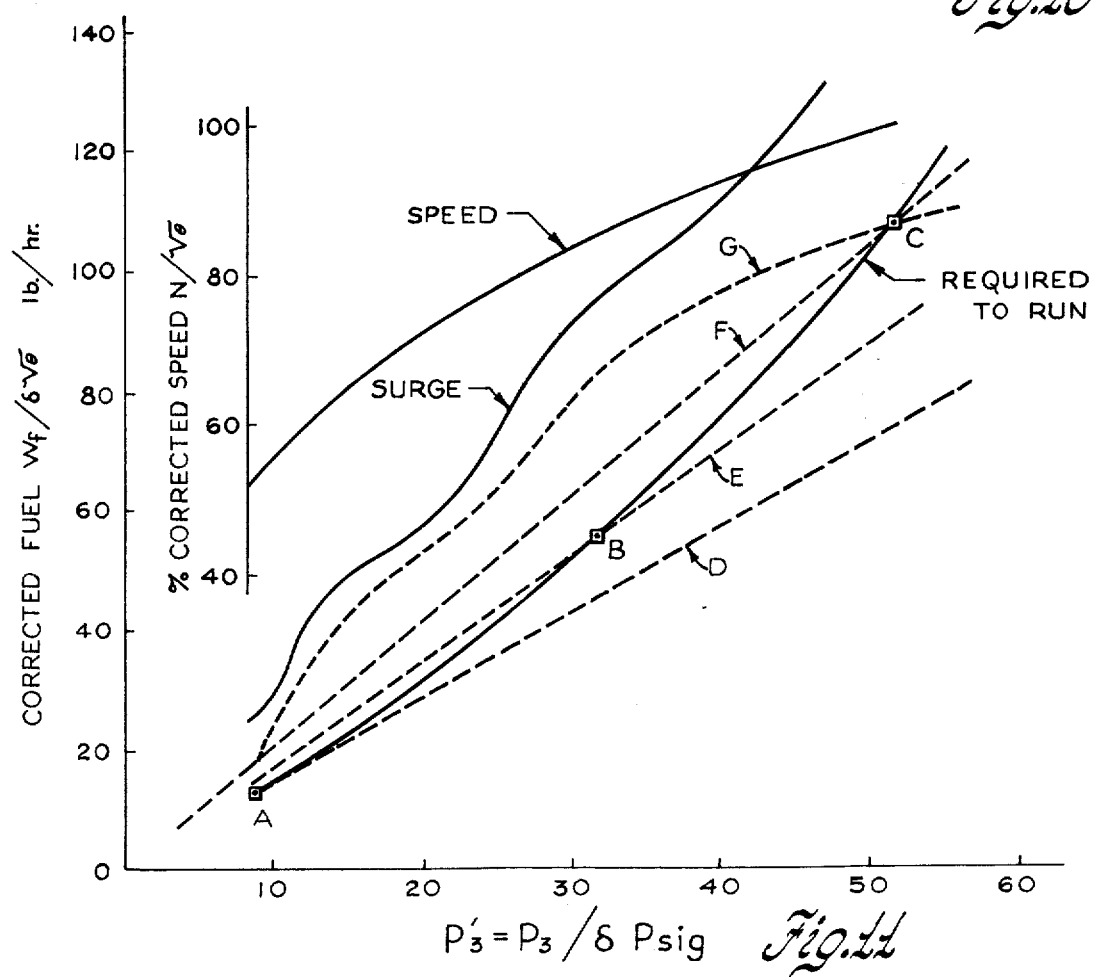

3,879,936

GAS TURBINE FUEL CONTROL

INTRODUCTION

My invention is directed to fuel controls for gas turbine engines and particularly to the provision of a simple control suitable for use with a small gas turbine.

A great number of fuel control devices for gas turbines, of varying degrees of complexity, have been proposed. If small gas turbine engines are to be employed in large numbers, it is clear that their fuel controls must be sufficiently simple that their cost is not prohibitive. The target might well be to have such a control no more expensive than a modern carburetor for an internal combustion engine. While this may be unattainable, my control system represents a very substantial approach toward this goal. The point of a control according to my invention is to provide a simple structure which is responsive to a power level control input and to a few readily measured and used parameters of engine operation. It is a feature of my control system that it eliminates complicated and expensive transducers such as thermocouples and their amplifiers and devices for measuring engine speed, all of which contribute to the complication of ordinary fuel controls.

A control according to my invention is based upon what may be termed the principle of equivalence; that is, for any given setting of a power level control input, it varies the flow of fuel in accordance with the principle of equivalence. This principle may be stated briefly as follows: For equivalent operation of the engine, the weight of fuel supplied must be equal to (1) the weight of fuel under standard atmospheric conditions for the given power level setting multiplied by (2) the ratio of actual atmospheric pressure to standard atmospheric pressure multiplied by (3) the square root of the ratio of absolute ambient temperature to standard ambient air temperature. Other pressures, the ratios of which vary proportionally to (2) above, may be used instead. I find it most suitable to use the ratio of compressor discharge (or combustion apparatus inlet) gauge pressure to standard atmospheric pressure. Based on this premise, my control includes a metering valve which is moved so that its effective area is proportional to (or a function of) the product of control input setting and compressor discharge pressure or combustion chamber air supply pressure, these being substantially the same. Flow through the metering valve is determined by engine pressure for any given fuel pressure drop through the metering valve. The pressure drop across the metering valve (metering head) is controlled by a pressure regulating valve which responds to this pressure drop and to ambient air temperature so that the pressure drop is proportional to ambient air temperature. Since flow through an orifice is proportional to the square root of pressure drop, the flow through the metering valve for any given effective area is proportional to the square root of the ratio of ambient air temperature to standard air temperature. Multiplying the effects of area and pressure drop in the metering valve, fuel flow will be found to be that called for by the principle of equivalence referred to above. Thus, these few elements constitute a fuel control device.

Another component of this basic fuel control device, which is desirable in many installations, is a cutoff valve which is effective to terminate supply of fuel temporarily, or to reduce it to a pilot level, whenever the power level signal is reduced to decelerate the engine and reduce power output.

The principal objects of my invention are to provide a simple fuel control for a gas turbine engine which is economical to manufacture and reliable in operation; to provide a fuel control which avoids the necessity for complicated or expensive responsive devices and transducers for the fuel control; to provide a control which operates according to the principle of equivalence; and to provide an integrated fuel pump and control assembly which is simple, compact, and inexpensive to manufacture.

DESCRIPTION OF THE STRUCTURE

The nature of the invention and its advantages will be clearly apparent to those skilled in the art from the succeeding detailed description of the preferred embodiment of the invention.

Referring to the drawings, FIG. 1 is a schematic diagram of a fuel supply system.

FIG. 6 is a longitudinal sectional view of the same taken on the plane indicated by the line 6—6 in FIG. 3.

FIG. 7 is a cross-sectional view of the same taken on the plane indicated by the line 7—7 in FIG. 2.

FIG. 8 is a cross-sectional view of the same taken on the plane indicated by the line 8—8 in FIG. 2.

FIG. 9 is a cross-sectional view of the same taken on the plane indicated by the line 9—9 in FIG. 3.

FIG. 10 is a partial cross-sectional view of the same taken on the plane indicated by the line 10—10 in FIG. 2.

FIG. 11 is a set of curves descriptive of operation of the control with a representative gas turbine engine.

Figure 1:
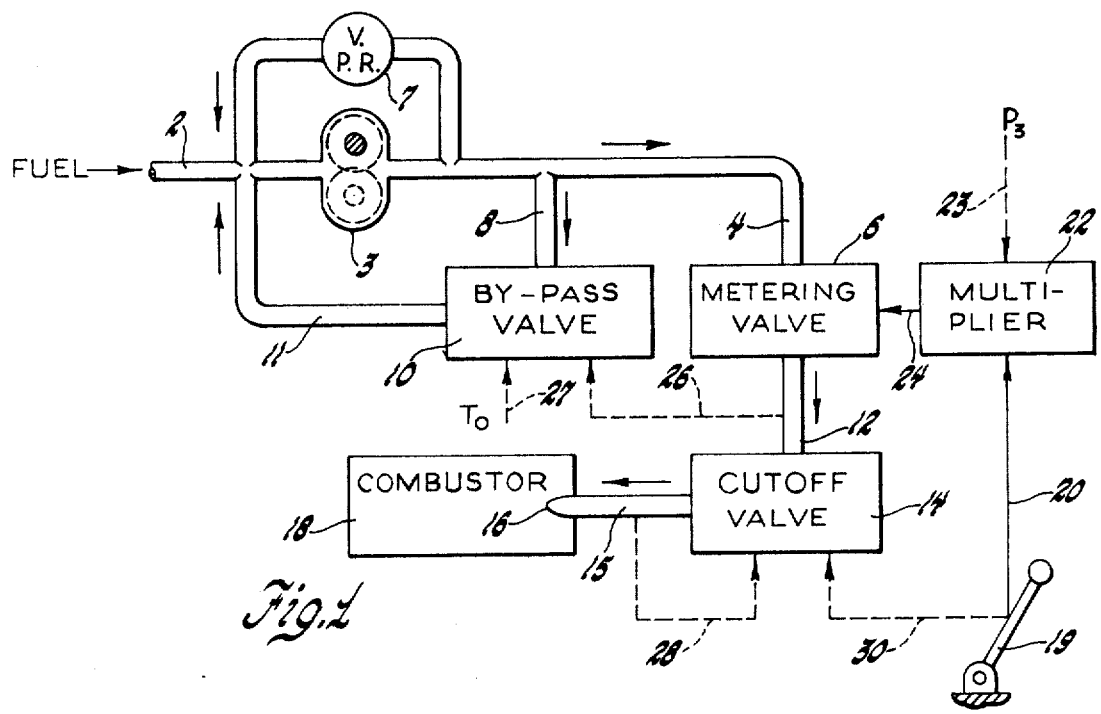

Referring first to FIG. 1, engine fuel from any suitable source, such as a boost or transfer pump supplied from a fuel tank, enters the system through an inlet 2 from which it flows to a pressure pump 3. This pump discharges through a conduit 4 to a metering valve 6, the effective area of which is varied to control flow of fuel to the gas turbine engine. A normally closed maximum pressure relief valve 7 is connected across the pump. The pump also discharges through a conduit 8 into a metering head regulating by-pass valve 10 which returns fuel in excess of that required by the engine to the pump inlet through a conduit 11. The metering valve 6 supplies fuel through a conduit 12, a cutoff valve 14, and a fuel delivery line or engine fuel line 15 to a fuel spray nozzle 16 in the engine combustion apparatus or combustor 18.

The structure of the engine is not illustrated, as it may be of various known types. A typical engine includes a compressor which delivers compressed air to the combustor 18 in which fuel is burned and from which the combustion products flow to a turbine which drives the compressor. These constitute a gas generator. A second turbine driven by exhaust gas from the first turbine provides a shaft power output to drive a vehicle or for other purposes. In many cases a regenerator is provided to heat the air flowing from the compressor to the combustor by heat exchange with the exhaust gases from the turbine or turbines. For purposes of reference, an engine of this general nature is described in the U.S. Pat. Nos. to Collman et al., No. 3,077,074, Feb. 12, 1963, and No. 3,267,674, Aug. 23, 1966.

As indicated above, the metering valve 6 is a variable area throttling valve determining the effective orifice area for flow of fuel to the engine, and the by-pass valve determines the pressure drop across the metering valve. The control input to determine engine power level is sent by a power control lever 19, which may be any suitable controllable device such as a foot throttle pedal, for example. As indicated schematically by the line 20, this provides an input to a multiplier 22 which also receives an input of compressor discharge pressure or combustor pressure level from a piston acting against a spring, as indicated by the legend $P_3$ and the line 23. As indicated by the arrow 24, the output of the multiplier controls the metering valve, specifically the area for flow through the valve.

The by-pass valve 10 responds to metering valve inlet pressure through conduit 8 and responds also to metered fuel pressure downstream of the metering valve 6 taken from conduit 12 through a sense conduit indicated by the arrow 26. The pressure level maintained by the by-pass valve responds to ambient atmospheric temperature, as indicated by the symbol $T_0$ and the arrow 27.

The cutoff valve 14 is biased to close by the pressure in the fuel delivery line 15 as indicated by the arrow 28 and is biased to open by a variable force responsive to power control input as indicated by the arrow 30.

With this introduction, we may proceed to a description of the physical embodiment of the system.

Figure 2:
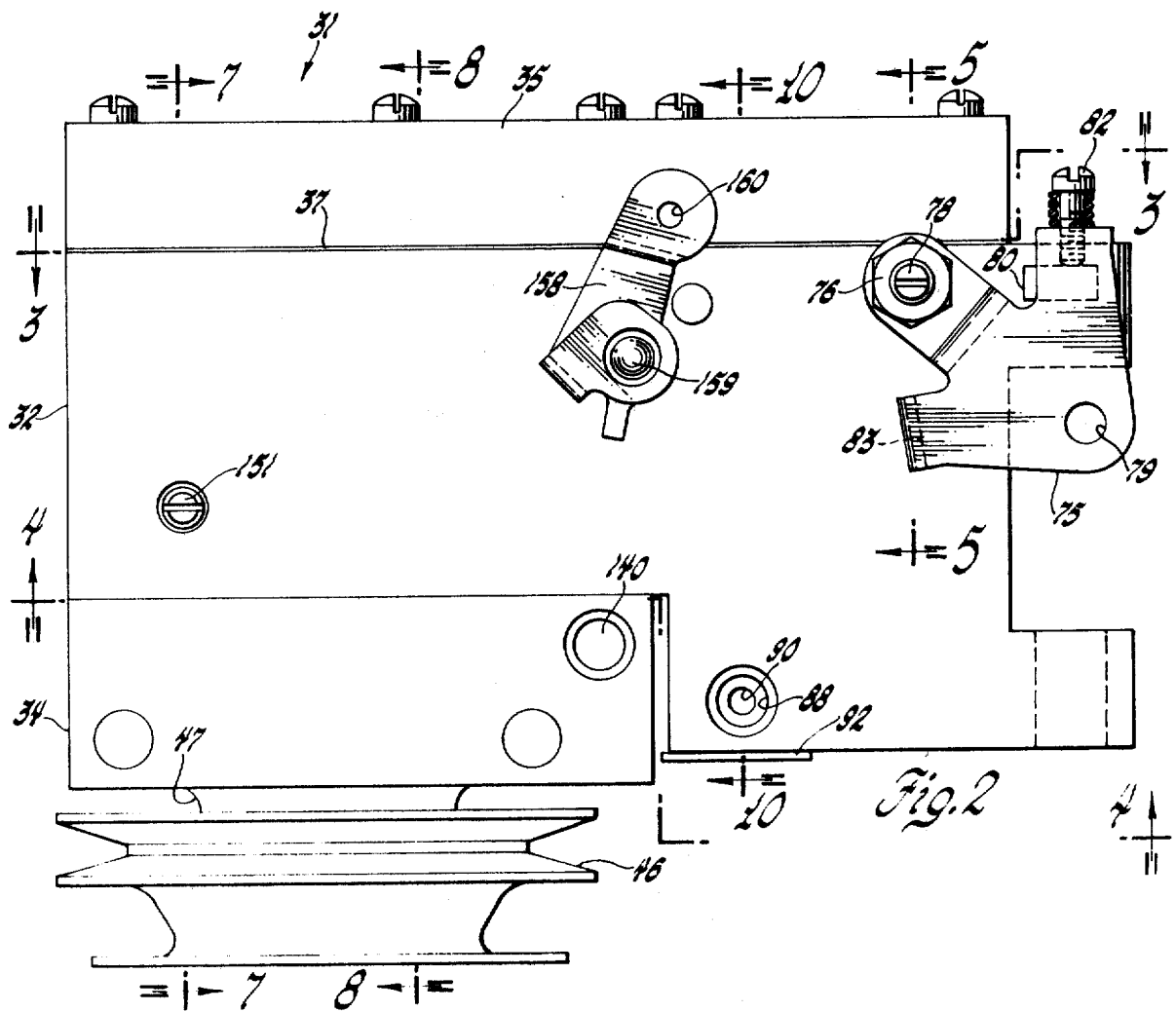
FIG. 2 is a plan view of a fuel supply assembly.

Referring first to FIGS. 2, 4, 6, and 7, a fuel supply assembly 31 comprises a body 32, a front cover 34, and a rear cover 35, both covers being fixed to the body by cap screws. The body and rear cover define between them a chamber 36 sealed by gasket 37 having a fuel inlet fitting 2 to which fuel is supplied at a low pressure such as 2 to 5 psig (referred to as transfer pressure) by a transfer pump. A small filter or screen 38 is disposed in the fuel inlet. From the chamber 36, which is maintained full of fuel at transfer pressure, the fuel flows to the pressure pump 3 (FIGS. 4 and 6) through a chamber 39 extending from chamber 36 and a pump inlet passage 40. The pump is of the gear type with gears 42 and 43 meshing in a figure eight shaped cavity machined in the forward face of body 32. Gear 43 is fixed to a shaft 44 driven by a pulley 46 (FIG. 2). The bearing supporting pulley 46 is mounted in a nose 47 extending from the front cover so that the bearing can be mounted in the belt plane of the pulley 46 to avoid side loading on the bearing. O-ring grooves indicated generally at 50 are provided in the front face of body 32 to seal against leakage of fluid between the various passages at the interface between the body and front cover 34.

The pump discharge passage 48 leads into a fuel passage 51 the outer end of which is plugged and the inner end of which leads to a bore 52 for the by-pass valve 10 (FIGS. 6 and 8). A movable valve member 56 is reciprocable in a sleeve 58 fixed in the bore 52. The stem of this valve is fluted so that as it moves out of the sleeve 58 (downwardly as illustrated in FIG. 6) it progressively opens communication from the pump delivery passage 51 to the pump inlet passage 40. The head of valve member 56 bears against a radially extending tab on the outer end of a spiral spring 59, the opposite surface of which bears against a by-pass valve piston 60 slidable in a sleeve 62 in a bore in the front cover 34 aligned with bore 52. The operation of spring 59 and piston 60 to control the by-pass valve will be taken up later.

The maximum pressure relief valve 7 comprises a ball 63 biased against a seat aligned with passage 48 by a compression spring 64 retained by a tubular insert 66 screwed into the body. In the event of pump overpressure, the valve unseats and discharges fuel to the chamber 36 which is at pump inlet pressure.

Pump discharge passage 51 also communicates with an intersecting passage 4 constituting the inlet to the fuel metering valve 6 (also shown in FIG. 7). This valve comprises a stationary valve member 67 in the form of a small ring or washer retained in a recess at the forward end of passage 4 by an O-ring 68. The area for flow through the orifice defined by member 67 is varied by a reciprocable valve needle 70 fixed to an actuating rod 71. The valve needle may move upwardly as illustrated in FIG. 6 from the valve closed position illustrated, the taper of the needle 70 progressively increasing the flow area as it moves upward. Needle 70 is received in a bore 72 in the front cover which communicates with the metered fuel passage 12. The pressure of metered fuel in passage 12 bears against by-pass valve piston 60 to bias the valve toward closing, and passage 12 also leads to the engine through cutoff valve 14, as will be explained.

It should be noted that the flow from pump discharge passage 48 into the conduit 4 is not direct, but must flow through a tubular insert 74 fixed in the passage 51 extending from passage 4 to a point between passage 48 and bore 52. Flow from the pump to the by-pass valve 10 must pass around the exterior of this insert. Flow to the metering valve 6 must reverse direction to flow through the insert 74. Thus total (static plus dynamic) pump discharge pressure is delivered to the by-pass valve, while only static pressure, slightly diminished by the ejector action of flow past the exterior of the insert, is delivered to the metering valve. As a result, when pump output greatly exceeds metered fuel demand, valve 56 has the ability to by-pass fuel adequately while maintaining the desired metering differential across the metering valve.

Proceeding now to the mechanism for moving the actuating rod 71 of metering valve 6, the power level control input indicated as 19 in FIG. 1 connects by suitable linkage (not illustrated) to an input arm 75 (FIGS. 2, 3, and 5) fixed adjustably by a nut 76 to the threaded end of an input shaft 78 journaled in the body 32. The input may be connected to the arm by a bolt or rod passing through a hole 79 in arm 75. Ends of the arm are offset to provide limit stops which coact with a boss 80 extending from the body; the arm 75 is shown in the closed throttle position defined by an adjustable screw 82 engaging the boss 80. The wide open stop is defined by flange 83 on the arm. The arm 75 is threaded so that it may be adjusted circumferentially with respect to the shaft 78 and locked in the desired angular position by the nut 76 acting as a jam nut.

The power level input represented by shaft 78 is communicated to the multiplier 22 and to the cutoff valve 14. These connections will be explained after description of the temperature and pressure inputs to the fuel control.

Figure 4:
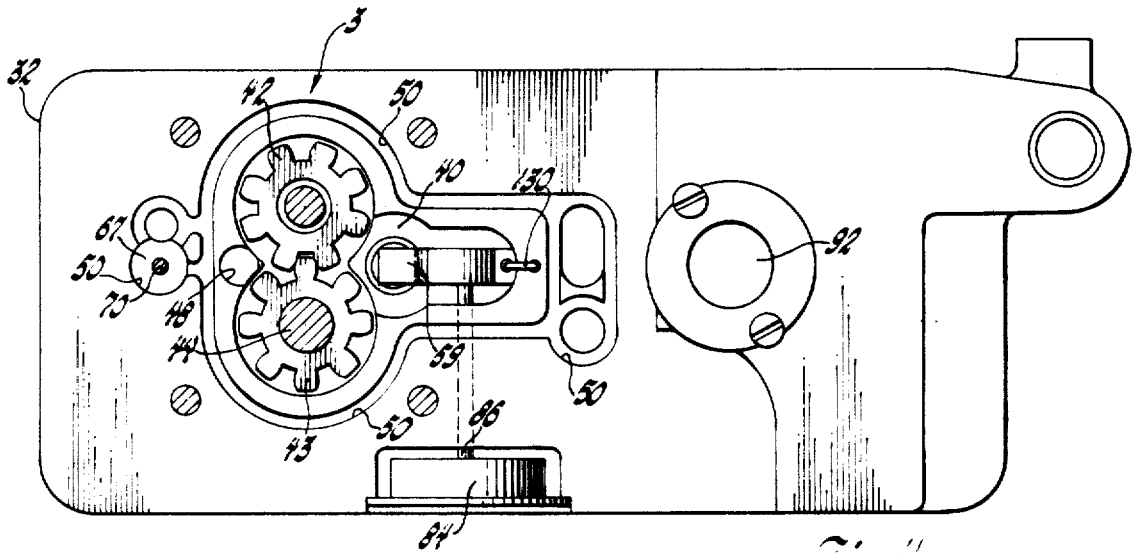
FIG. 4 is a longitudinal sectional view of the same taken on the plane indicated by the line 4—4 in FIG. 2.

Referring to FIGS. 4, 6, and 8, a temperature responsive spiral bimetal element 84 has one end fixed to the underside of body 32. This is in a position to be affected by ambient air flowing past it into the engine compressor inlet. The bimetal element rotates a shaft 86 extending into the body, the inner end of which is nonrotatably coupled to the inner end of the spiral spring 59 previously referred to. As ambient temperature increases, the upward force of the spring on the by-pass valve member 56 is varied in direct proportion to the increase in absolute ambient temperature, so that the differential between pump discharge pressure and metered fuel pressure increases accordingly. The spring allows the by-pass valve to stroke to vary the amount of fuel by-passed without any significant change in the metering head.

The pressure sense 23 (FIG. 1) from the compressor discharge or combustion chamber may be supplied through tubing to an inlet connection 88 (FIGS. 2 and 10) and a passage 90 into the lower end of a cylinder 91 (FIGS. 6 and 10), the forward end of which is closed by a head 92 secured by screws and sealed by an O-ring. A piston 94 reciprocable in the cylinder is biased towards the head 92 by a coil spring 95 seated against an abutment 96 bearing against a wall at the inner end of the cylinder. The piston 94 is adjustably threaded to a push rod 102 which passes through a hole 103 in the body into the chamber 36 in which is mounted the multiplying linkage or multiplier 22. A very small O-ring 104 retained by abutment 96 seated in a recess at the entrance to hole 103 seals against leakage of low pressure fuel. The inner end of cylinder 91 is vented to atmosphere through a passage 105 so that the piston 94 is urged toward chamber 36 by the pressure supplied from the engine; and its displacement is linear with respect to pressure, as spring 95 has a linear characteristic.

Proceeding with the multiplier 22 (FIGS. 3, 5, 6, and 7), the end of push rod 102 bears against the free end of a $P_3$ piston lever 106 mounted in chamber 36. This lever is essentially a bent wire having a shaft end 107 retained in a pivot block 108 by a clip 110 secured to the body 32 by a screw. As viewed in FIG. 6, lever 106 is moved counterclockwise as pressure increases. Lever 106 is connected by a movable crossbar 111 to a metering rod actuating lever 112. Lever 112 also is essentially a bent wire structure, having the ends turned out to provide pivots 114 rotatably received in bores in the walls bounding chamber 36. The free ends of the two sides of lever 112 are flattened and are fixed together.

Lever 112 is coupled to the metering valve actuating rod 71 by a bolt 115 and nut 116. The rod 71 passes through a transverse hole in the bolt, and tightening the nut on the bolt retains the stem 71 in a fixed position in the hole but leaves the bolt rotatably free in the one-piece formed lever 112. By loosening the screw, the position of the metering valve may be adjusted.

The multiplying function in response to the control input is performed by the crossbar 111 which is connected by multiplier links 118 integral with the bar to a crank 119 (FIGS. 3, 5, 6, and 10) adjustably mounted on the input shaft 78. As will be clear from the Figures, the crank 119 is a folded sheet metal structure including a bridge 120 tapped for a set screw which presses through a tongue 123 against the shaft. Side plates of the crank 119 are punched to receive the inturned ends 124 of the links 118. As the input shaft is rotated counterclockwise as viewed in FIG. 6 to increase engine power output, the links 118 are moved to the right as viewed in that Figure, moving crossbar 111 to the right and thereby increasing the ratio of movement of the metering rod lever 112 to that of the $P_3$ piston lever.

Figure 5:
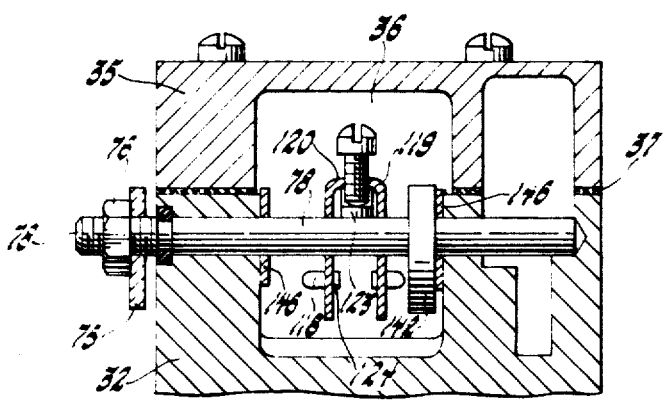
FIG. 5 is a partial cross-sectional view of the same taken on the plane indicated by the line 5—5 in FIG. 2.
Figure 5A:
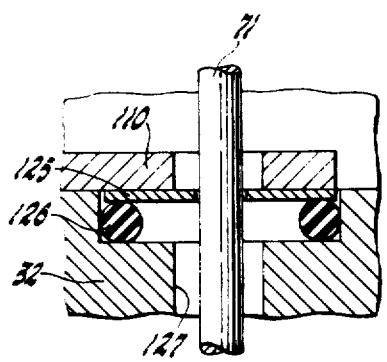
FIG. 5A is a greatly enlarged sectional view of a valve actuating rod seal.

The metering valve stem 71 passes through a small hole in the bracket 110 which bracket also retains a sealing washer 125 and an O-ring 126 in a recess surrounding hole 127 (see FIG. 5A). The washer 125 provides for free sliding movement of rod 71 but has a very close clearance from the rod, about one thousandth inch, so that leakage is negligible. FIG. 5A is about 6 times full scale. The O-ring seals between washer 125 and the body 32. A small amount of leakage along stem 71 is immaterial, as it has no effect on the quantity of fuel metered. A light coil spring 128 (FIG. 6), one end of which is hooked over the metering rod lever 112 and the other of which is attached at 130 to the body, tends to close the metering valve and holds the elements of the multiplying linkage in constant engagement. The upper end of metering valve needle 70, as shown, may be slightly enlarged so as to seat as a valve poppet against seat 67 in the shutoff position of the fuel control.

At this point we may consider the cutoff valve 14 shown in FIGS. 6 and 9. A cylinder 131 bored in the body 32 from chamber 36 to the front face receives a valve spool 132 having lands 133 guided in the cylinder. The forward end of the piston bears a head 134 which is a movable poppet valve member engageable with an annular seat 135 in a chamber 137. A slight closing force is exerted on valve 114 by a small compression spring 136. As shown in FIG. 9, the passage 12 in the front cover communicates through a bore 138 in the front cover and a bore 139 in the body with the cylinder 131 in front of the forward land 133. When the valve is closed, the pressures on land 133 and head 134 balance, but the valve will remain closed, due to spring 136 and the pressure differential between chambers 137 and 36, unless some force is exerted to open it. When the valve is open, the fuel may flow from passage 139 through cylinder 131 and chamber 137 into an outlet 140 to the fuel line 15 leading to the combustion apparatus.

Figure 3:
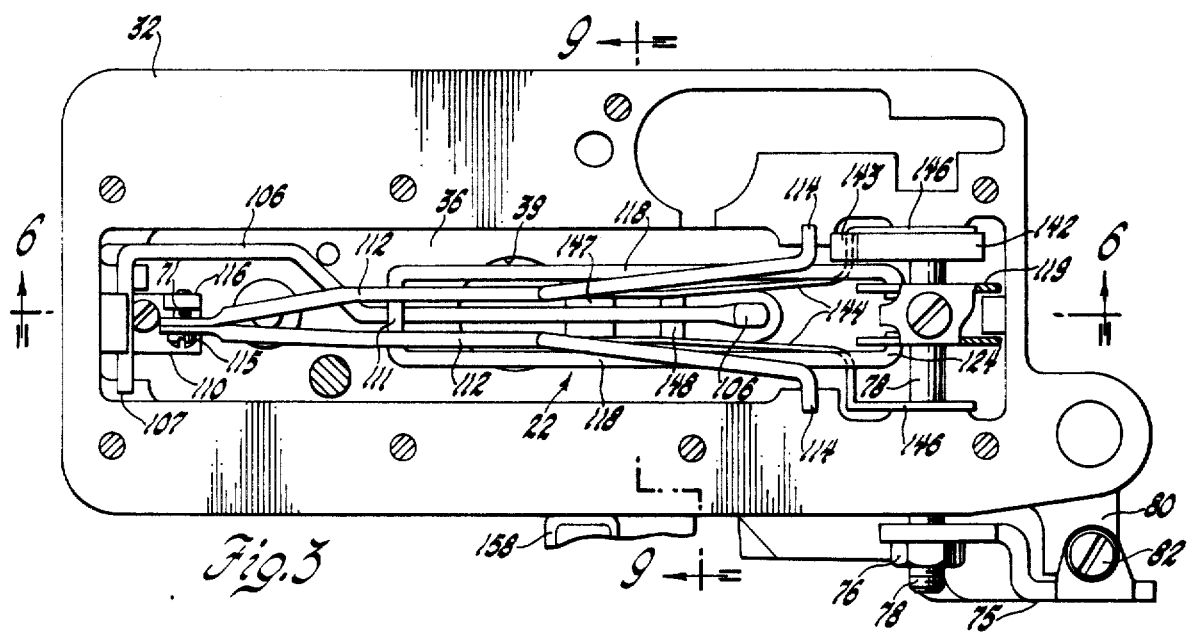
FIG. 3 is a longitudinal sectional view of the same taken on the plane indicated by the line 3—3 in FIG. 2.

The cutoff valve is biased to open by a force progressively increasing as the power control input is increased by resilient means coupled to the power input shaft 78. Referring to FIGS. 3, 5, and 6, a spiral spring 142 with its inner end fixed to shaft 78 has its outer end bent over at 143 to bear against a cutoff valve actuating arm 144, which is a folded sheet metal construction with end portions 146 bearing against the walls of chamber 36 and pivoted on shaft 78. The two sides of arm 144 are joined by bridge portions 147 and 148, the former of which bears against the rear end of valve spool 132, tending to open the valve. Thus, the cutoff valve is biased to close by the pressure of fuel supplied to the engine, which must at least equal combustion chamber pressure even at no flow, and also by the spring 136. It is biased to open by a force which increases with increase in power signal and by a small force due to boost pressure in chamber 36. If, for example, the power signal is cut back sharply to decelerate the engine, fuel or combustion chamber pressure will overcome the reduced force of spring 142 on arm 144 and the cutoff valve will close. With this valve closed, the fuel will not be blown back out of the fuel line into the fuel control. The line will be kept full but closed off until such time as the fuel control input calls for a fuel delivery pressure greater than the pressure existing at the point of discharge.

FIG. 7 illustrates an optional adjustable jet which may be provided to adjust the minimum flow of fuel mainly to trim flow for starting and idling of the engine without respect to the operation of the other parts of the fuel control. This consists of a simple by-pass for the metering valve 6. A needle valve member 150 is integral with an adjusting screw 151 by which it may be moved into and out of a fuel metering orifice 152. The valve takes fuel from the bore 4 and discharges it through a conduit 154 to the bore 72 downstream of the metering valve. The slight flow has little effect at higher power operation of the engine.

The fuel control assembly also includes a cutoff arm 158 which rotates a cutoff shaft 159 (FIGS. 2, 6, and 9). The cutoff lever is actuated independently of the power input arm by a suitable link to a hole 160 in the arm. The arm is shown in the Run position and may be rotated counterclockwise as viewed in FIG. 2 to shut down the engine. When it is so rotated, the flat 162 of the shaft is rotated to engage the bridge 148 of the cutoff valve actuating lever 144 and raise it, as viewed in FIG. 6, so that it no longer engages the cutoff valve; whereupon the cutoff valve will close.

The cutoff arm also may be used to open the metering valve 6 slightly for starting if desired. If this feature is included, an arm 164 (FIGS. 6 and 9) may engage a link 118 to raise, through the crossbar 111, the valve actuating arm 112 and thus open the fuel metering valve to the desired extent.

OPERATION

It is believed the operation of the control should be clear from the foregoing, but it may be reviewed briefly with reference to the curves of FIG. 11. In this Figure, various conditions are plotted against corrected gauge pressure in the combustion apparatus (or compressor discharge) which equals actual discharge pressure divided by the ratio of atmospheric or barometric pressure to standard atmospheric or barometric pressure. The curve indicated as "Speed" is corrected speed of the gas generator turbine of a particular engine. Corrected speed is corrected for ambient atmospheric temperature and is actual speed divided by the square root of the ratio of actual absolute temperature to standard absolute temperature.

The remaining curves are plots of corrected fuel flow in pounds per hour for this particular engine as against the same corrected pressure. Corrected fuel flow is the rate of fuel per unit time divided by the product of delta times the square root of theta where delta is the ratio of atmospheric pressure to standard atmospheric pressure, and theta is the ratio of atmospheric temperature to standard atmospheric temperature. The particular engine considered here idles at half speed with a CDP of 8 psig and runs at full speed with a CDP of 52 psig. The solid line marked "Required to Run" indicates the amount of fuel required to run the gas generator of the engine, at steady state. Because of the correction for delta and theta, the curves are correct for all ambient conditions.

The curve entitled "Surge" represents the maximum amount of fuel that can be supplied to the engine without causing surge, which is caused by overload of the compressor and limits the possible fuel intake and power output of the gas generator. The points indicated as A, B, and C on the Required to Run curve represent operation at 50%, about 85%, and 100% (full) corrected speed. With the values of fuel flow indicated at these points, the engine will run at these speeds. If it is desired to accelerate the engine from any given speed, the fuel must be increased. It must ultimately increase to the amount required for steady state running at the higher speed, but the fuel flow must not exceed that occasioning surge.

The broken lines indicated as D, E, and F represent the fuel metered by the control, with a fuel metering valve which has a linear characteristic, at different settings of the power control input. Line D represents fuel flow at different CDP values with the control set for idle. The line E represents fuel flow at different CDP values with the control set for 85% speed, and the line F represents fuel flow at different CDP values with the control set for full speed.

Assuming that the engine is idling, if the control is advanced to full speed position, the fuel flow will rise from the curve D to the curve F due to the action of the multiplying linkage of the controls in response to the movement of the power control lever. Then, as the engine accelerates because of the excess of fuel over that required to run and the compressor discharge pressure rises, the fuel will increase along the line F as speed and pressure increase. At the point C, the amount of fuel supplied intersects the Required to Run curve and the engine resumes steady state operation. If the control is moved back as, for example, to cause fuel to flow according to the line E, the engine will decelerate until the fuel flow curve intersects the Required to Run as at the point B. Because of the employment of the principle of equivalence, there is no need for correction or limiters other than what is put into the control by the employment of ambient temperature and CDP as controlling parameters for fuel control.

The curved dotted line identified as G in FIG. 11 represents a fuel flow line which approaches more nearly to the surge line than the linear characteristic of line F. If the engine when accelerated from idling is supplied fuel in relation to pressure along the line G, the fuel is insufficient to cause surge, but exceeds that called for by the linear characteristic and therefore results in quicker acceleration of the gas generator. This result may be had by contouring the metering valve needle 70 so that the flow for any position of the needle corresponding to full throttle input will follow the line G rather than the line F. With such a contoured needle, the curves other than the 100% speed curve will also follow a similar curvature.

Thus, it is not necessary, and in general not desirable, that the characteristic of fuel flow as against compressor discharge pressure during acceleration be linear; and the metering valve needle will ordinarily be contoured with due regard for the characteristics of a particular engine to improve the acceleration characteristics. Once engine tests have determined the amount of fuel that may flow, the matter of contouring a needle to provide the desired flow areas is very simple.

It may be desirable also to refer again to the arrangement for delivery of fuel from the pump to the metering valve 6 and by-pass valve 8. As shown in FIG. 6, the fuel pump discharges into the annular fuel conduit 51 around the tubular insert 74. Flow to the by-pass valve continues through the downstream part of passage 51 coaxial with the annular pump discharge passage. Thus, both the static pressure and dynamic pressure (so far as it is recovered) of the fuel are exerted against the by-pass valve member 56. The flow to the metering valve must reverse direction and flow through the interior of insert 74. This reversal of direction of flow nullifies the velocity head of the pump discharge as it flows past the entrance to insert 74. The pressure exerted at the inlet to the metering valve is only the pump static pressure without the total pressure and presumably slightly further diminished from the static pressure as the result of the ejector action at the entrance to insert 74.

The total rate of flow from the pump and the division of flow between the metering valve and by-pass valve vary greatly with conditions of operation of the engine such as the speed of operation and whether the engine is at steady state or is being accelerated or decelerated. It has been found by experience that this arrangement to insulate the metering valve from the dynamic or velocity head of the fuel is quite effective in stabilizing operation of the metering valve and providing smooth metering action of the fuel control notwithstanding variations of engine operating conditions.

It will be apparent to those skilled in the art that I have disclosed a simple, compact, and rational control for a gas turbine engine.

The detailed description of preferred embodiments of the invention for the purpose of explaining the principles of the invention are not to be considered in any limiting or restricting sense, as many modifications may be made by the exercise of skill in the art.

I claim:

1. A fuel supply system for a gas turbine engine comprising a pump for delivering fuel under pressure, a metering head regulating by-pass valve connecting the outlet of the pump to the pump inlet, a fuel metering valve supplied by the pump, and a fuel delivery conduit to the engine combustion apparatus supplied through the fuel metering valve, in combination with controlling means comprising; a settable power level control; means responsive to combustion chamber pressure; multiplying means actuated by the power level control and the pressure responsive means operative to control the metering valve to maintain metering valve effective area a predetermined function of the product of the said pressure and the power level setting; means responsive to ambient air temperature; and means actuated by pressure drop across the metering valve and the temperature responsive means operative to control the by-pass valve to maintain metering head proportional to ambient temperature.

2. A system as recited in claim 1 in which the pressure responsive means is calibrated to provide an output substantially proportional to absolute pressure.

3. A system as recited in claim 1 in which the temperature responsive means is calibrated to provide an output substantially proportional to absolute temperature.

4. A system as recited in claim 3 in which the pressure responsive means is calibrated to provide an output substantially proportional to absolute pressure.

5. A fuel supply system for a gas turbine engine comprising a pump for delivering fuel under pressure, a metering head regulating by-pass valve connecting the outlet of the pump to the pump inlet, a fuel metering valve supplied by the pump, a cutoff valve supplied through the metering valve, and a fuel delivery conduit to the engine combustion apparatus supplied through the cutoff valve, in combination with controlling means comprising; a settable power level control; means responsive to combustion chamber pressure; multiplying means actuated by the power level control and the pressure responsive means operative to control the metering valve to maintain metering valve effective area a predetermined function of the product of the said pressure and the power level setting; means responsive to ambient air temperature; means actuated by pressure drop across the metering valve and the temperature responsive means operative to control the by-pass valve to maintain metering head proportional to ambient temperature; means responsive to pressure in the fuel delivery conduit biasing the cutoff valve to close; and means responsive to the power level control biasing the cutoff valve to open, so that the cutoff valve closes when delivered fuel pressure exceeds that required by the power level control.

6. A fuel supply system for a gas turbine engine comprising a pump for delivering fuel under pressure, a metering head regulating by-pass valve connecting the outlet of the pump to the pump inlet, a fuel metering valve supplied by the pump, a cutoff valve supplied through the metering valve, and a fuel delivery conduit to the engine combustion apparatus supplied through the cutoff valve, in combination with controlling means comprising; a settable power level control; means responsive to combustion chamber pressure; multiplying means actuated by the power level control and the pressure responsive means operative to control the metering valve to maintain metering valve effective area a predetermined function of the product of the said pressure and the power level setting; means responsive to ambient air temperature; means actuated by pressure drop across the metering valve and the temperature responsive means operative to control the by-pass valve to maintain metering head proportional to ambient temperature; means responsive to pressure in the fuel delivery conduit biasing the cutoff valve to close; and means responsive to the power level control biasing the cutoff valve to open with a force increasing with increasing power signal, so that the cutoff valve closes when delivered fuel pressure exceeds that required by the power level control.

7. A fuel supply system for a gas turbine engine comprising a pump driven by the engine, a fuel metering valve for controlling flow of fuel from the pump to the engine, and a by-pass valve connected for flow from the pump outlet to the pump inlet effective to regulate the head across the metering valve and return excess pumped fuel to the pump inlet, the system being characterized by a connection from the pump to the inlet of the by-pass valve such that the by-pass valve inlet is subjected to total static plus dynamic pressure of the pumped fuel and by a connection from the pump to the inlet of the metering valve such that the metering valve is subjected substantially to the static pressure only of the pumped fuel.

8. A fuel supply system for a gas turbine engine comprising a pump driven by the engine, a fuel metering valve for controlling flow of fuel from the pump to the engine, and a by-pass valve connected for flow from the pump outlet to the pump inlet effective to regulate the head across the metering valve and return excess pumped fuel to the pump inlet, the system being characterized by a connection from the pump to the inlet of the by-pass valve such that the by-pass valve inlet is subjected to total static plus dynamic pressure of the pumped fuel and by a connection from the pump to the inlet of the metering valve such that the metering valve inlet is subjected substantially to the static pressure only of the pumped fuel, the said connections including a pump discharge conduit, a first conduit constituting a coaxial continuation of the pump discharge conduit leading to the metering valve inlet, the fuel in the said conduits flowing in the same direction, and a second conduit concentric with the pump discharge conduit leading from the pump discharge conduit to the metering valve, the direction of flow in the second conduit being opposite to that in the pump discharge conduit.

* * * * *